United States Patent Office 3,325,589
Patented June 13, 1967

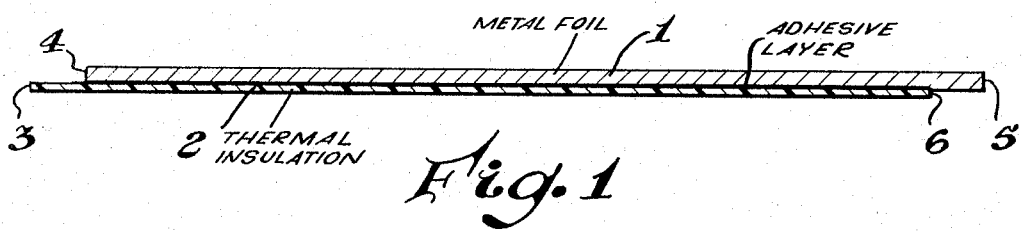
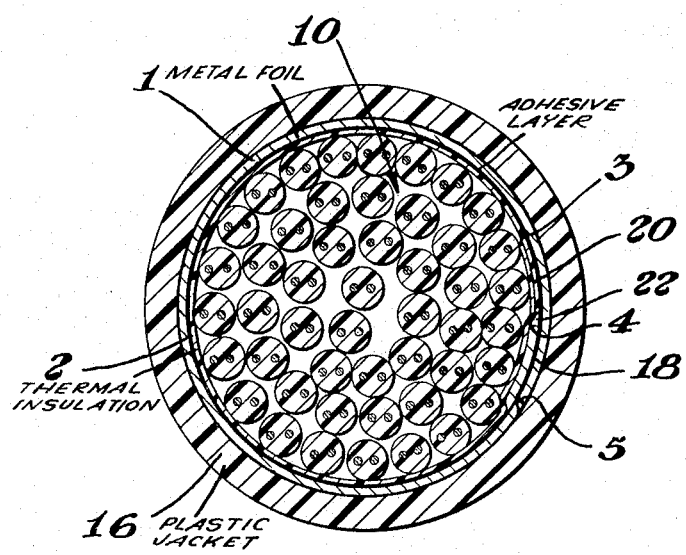

3,325,589
THERMAL BARRIERS FOR ELECTRIC CABLES
Raymond C. Mildner, Midland, Mich., assignor to The Dow Chemical Company, Midland, Mich., a corporation of Delaware
Filed Nov. 1, 1965, Ser. No. 505,837
12 Claims. (Cl. 174—107)

This invention relates to improved electric cables and more particularly it relates to electric cables having improved thermal insulation barriers.

Various materials are being employed as thermal insulating barriers to protect cable cores from heat damage during cable fabrication processes. For example, plastic tapes, rubber-plastic laminates and the like are employed as thermal barriers between a metallic shield and an inner conductor core as in communication cables. The thermal barriers are employed to protect the inner conductor core from heat damage such as from the heat of extrusion where a polymer jacket is extruded over the metallic shield or from an external source of heat employed to heat the metallic shield to promote the adhesion of a polymer jacket to the metallic shield. The barrier tapes also serve to increase the electric breakdown strength between the shield and the inner conductors. In certain respects, the above-described thermal barriers are not entirely satisfactory. The rubber-plastic laminates perform their functions excellently, but are expensive and being necessarily thick they lead to a bulky cable. The thin high temperature-resisting tapes are adequate in performance, but tend to slip out of position during manufacture and become creased when the cable is handled so that the electric breakdown strength is impaired. Also, some space in the cable is wasted because the barrier tape cannot be formed into a uniform cylinder and the overlaps of the barrier tape and metal shield are not aligned.

In accordance with the present invention there is provided a pre-fabricated laminated composite of thermal barrier and metallic shield as a new article of manufacture and improved cables constructed therefrom in combination with conventional inner cores and outer jackets. The new composite barrier and shield is a laminate of a sheet of the thermal insulating material bonded securely to a strip of metal sheet or foil and adapted to be folded or rolled longitudinally around a cable core to envelope the core with the resulting laminated shield having an overlapped longitudinal seam. The pre-fabricated composite barrier-shield has the sheet of thermal insulating material and the metallic strip offset laterally relative to each other so that there is a relatively narrow band running lengthwise of the metal strip along one edge thereof which is not covered by the barrier sheet lamina. On the other edge of the metal strip, the sheet of thermal insulating material extends beyond the edge of the metal lamina forming a relatively narrow edge band or flap of unsupported barrier material running lengthwise of the composite. The laminae, i.e. the sheet of thermal insulating material and the metal sheet, are securely bonded together in the co-extensive area of their overlap. This bond may be achieved by pre-coating the metal sheet on at least one side with an adhesive thermoplastic copolymer or an adhesion promoter such as polyethylene imine, placing the thermal insulating material on the coated metal sheet and subjecting the lay-up to heat sufficient to effect the bond. In constructing an improved cable from the pre-fabricated composite barrier-shield, the laminated article is folded or rolled around the cable core with the thermal barrier lamina inner-most and the edge having the free flap of that lamina under the other and overlapping the edge of the laminate, whereby the band of metal strip not covered by the barrier lamina is drawn over the outermost side of the opposite edge of the barrier-shield. The width of overlap of the metal shield edges in the resulting longitudinal seam should not be greater than the width of the band of metal strip left uncovered by the barrier lamina.

The laminated composite barrier-shield and cables constructed therewith will be better understood from the accompanying drawing and following description.

FIGURE 1 of the accompanying drawing is a schematic view of a lateral cross section of the new composite barrier-shield showing its laminated construction.

FIGURE 2 is a schematic end view of a cross section of a cable construction employing the laminated composite barrier-shield as shown in FIGURE 1.

As shown in FIGURE 1, a strip of metal sheet or foil 1 suitable for use as the metallic shielding member of an electric cable is bonded at the co-extensive surface area with a sheet 2 of material suitable for use as the thermal insulating barrier member of an electric cable. One edge 3 of the sheet 2 extends beyond the edge 4 of the metal strip 1, while the other edge 5 of the metal strip 1 extends beyond the edge 6 of the insulation sheet 2.

FIGURE 2 shows the pertinent features of an improved electric cable of the communications type constructed using the improved composite barrier-shield shown in FIGURE 1. In FIGURE 2, a cable core 10 of conventional design having at least one insulated metal conductor is surrounded by the composite barrier-shield rolled around the core with a longitudinal overlapped seam. The insulating lamina 2 is innermost and the edge 5 of the metal shielding member 1 overlaps its edge 4 at the seam 18; the edge 3 of the lamina 2 extends under and overlaps its opposite edge at 20. An outer plastic jacket 16 of conventional design surrounds the shielded core.

The face of the metal sheet 1 opposite the face having the insulating sheet 2 laminated thereto may and preferably does have a coating or layer of adhesive material which, in the cable shown in FIGURE 2, provides a bond between the metal shield 1 and the outer plastic jacket 16 and also advantageously forms a bond between the overlapped edges of the metal shield and seals the seam 18. A thin layer of suitable adhesive can be and preferably is placed on the edge flap 3 of the insulating sheet (on the side facing the metal sheet 1), the adhesive being preferably of the pressure-sensitive type, whereby the overlapped region 20 in the cable shown in FIGURE 2 is adhesively secured.

In an improved cable constructed as shown in principle in FIGURE 2, the thermal insulating barrier material 2 is co-extensively bonded to the metal shield 1. Moreover, the overlap at 20 effectively covers the edge 4 of the metal shield and the gap 22 where the metal shield would otherwise be exposed to the interior core region of the cable.

The pre-fabricated laminated composite of thermal barrier and metallic shield can be made, for example, by coating a thin metal sheet or foil on at least one side with a thin layer of adhesive and bonding the sheet of thermal insulating barrier material thereto, using any necessary heat and pressure to provide a secure bond between the laminae. Alternatively, an adhesive coating can be first (or also) applied to the sheet of thermal insulating barrier material. In some instances, the thermal insulating material can be bonded by heat and pressure directly to the metal shield material without an intermediate adhesive layer. As indicated hereinbefore, it is usually advantageous to provide the composite laminate with a layer or coating of adhesive material on the surface of the metal sheet or foil opposite the sheet of thermal insulating barrier, such adhesive material being preferably a thermoplastic, heat-activatable adhesive. Advantageously, such thermoplastic adhesive coating material also is of a kind that provides protection of the metal foil against damage by oxidation, corrosion, and mechanical forces.

Prior to formation in the laminate, the metal sheet or foil and/or the sheet of insulating material can be treated by methods known to improve adhesion, such as cleaning (by mechanical, solvent, or chemical means) and treatment with adhesion promoters and means.

Cables are constructed from the pre-fabricated laminated composite barrier-shield product of this invention by usual cable construction procedures, except that the procedures are simplified and improved and the resulting cable is more uniform, robust and reliable. In general, such cables are made by first constructing a core of one or more electrical conductors such as insulated copper wires. The core is then enclosed in the combination barrier-shield in accordance with this invention by continuously passing the core and the prefabricated barrier-shield to a station where the barrier-shield is incrementally rolled or folded longitudinally around the core in the manner hereinbefore described. While conventional apparatus and procedures are used, these are simplified because the barrier and shield are simultaneously shaped around the cable core in a single integrated operation at one station. Moreover, the resulting thermal barrier and shield members in the resulting cable are aligned, without any chance of forming wrinkles, gaps or other imperfections in the thermal barrier and without any bubbles or gas spaces between the metal shield and the insulating barrier sheet. The cable is finished in the usual manner by extruding a thermoplastic outer jacket over the metal shield.

The thermally insulating materials employed as the barrier sheet in the present invention are preferably compositions having high heat resistance, high dielectric strength and a melting point substantially higher than the melting point of the polymeric composition extruded over the cable core as the outer jacket. It is essential that the above-mentioned melting point requirement be observed since one of the primary purposes of the thermal barrier is to protect the cable core from heat damage during the extrusion of the outer jacket. Examples of thermoplastic compositions that may be employed as a thermal barrier include polypropylene, poly(4-methyl pentene), poly(ethylene terephthalate) and the like. Materials other than thermoplastic compositions may be employed as the thermal barrier where desirable, e.g. paper, preferably acetylated paper since it shows good resistance to moisture.

The metals employed in the form of sheets or foils as or for shielding elements in cables in accordance with the invention include aluminum, copper, copper-bronze, copper-clad steel, tin-plated steel, galvanized iron and the like.

The metal lamina is preferably adhesively bonded to the thermally insulating lamina by means of an adhesive thermoplastic composition such as a copolymer of ethylene and an ethylenically unsaturated carboxylic acid, e.g. ethylene and acrylic acid. This adhesive composition provides an excellent bond between the barrier and metal substrate, said bond being highly resistant to moisture and more important, the bond does not fail as the result of uneven stresses applied to it when the laminate construction is longitudinally folded about the cable core. The adhesive bond also prevents slipping between the thermal barrier and the metal shield.

One of the important advantages of the particular thermal barrier construction of the invention is that the danger of forming creases in the insulating material itself is reduced, the creases being "weak spots" and possible sources of electrical failure.

The following examples are illustrative of the invention but are not intended to limit the scope thereof.

*Example 1*

A coating layer of a copolymer of ethylene and about 8 weight percent of acrylic acid is applied by melt extrusion to an aluminum strip about 8 mils thick. A thin coating of polyethylene imine is applied to the copolymer layer. A strip of poly(ethylene terephthalate) film about 5 mils thick is applied to the coated aluminum tape in a manner such that a portion of the film strip extends ½ inch beyond one edge of the metal strip, leaving the metal strip to extend beyond the film ⅜ inch at the opposite edge. The lay-up is placed in a hydraulic press and subjected to a temperature of about 140° C. and pressure of about 100 p.s.i. for about 1 minute. The resulting laminate is cooled in the press and removed.

*Example 2*

The laminate constructed according to Example 1 is longitudinally folded around a cable core or bundle with the poly(ethylene terephthalate) film adjacent the core or bundle so that the metal tape edges overlap at the edge without film in the area of the overlap. The extended portion of the film covers and extends beyond the metal overlap, providing complete insulation of the core from the metal shield. A plastic jacket of polyethylene containing about 2.5 weight percent carbon black is extruded concentrically over the metal shield.

*Example 3*

Preformed composite thermal barrier-metal shield structures are made in accordance with Example 1, and cables are made therefrom according to Example 1, except that, in place of the strip of poly(ethylene terephthalate) film, there are used strips of films, each about 5 mils thick, of the following materials:

(a) isotactic polypropylene
(b) poly(4-methyl pentene)
(c) acetylated paper.

*Example 4*

Preformed composite thermal barrier-metal shield structures are made in accordance with Examples 1 and 3, and cables are made therefrom according to Example 2, except that, in place of the aluminum foil, there are used strips of metallic materials, and about 8 mils thick, as follows:

(a) copper
(b) copper-bronze
(c) tinned steel
(d) galvanized iron.

*Example 5*

A cable is prepared in accordance with the procedure of Example 2 except that poly(4-methyl pentene) fiber is substituted for the polyethylene terephthalate film as the thermally insulating material.

What is claimed is:

1. In an electric cable comprising a core of at least one insulated metallic conductor, a thermal barrier of insulating material surrounding the core, a metallic shield surrounding the insulating material, and an outer plastic jacket surrounding the metallic shield, the improvement wherein the insulating material is a thin sheet bonded to the metallic shield forming a laminated composite having a first edge at which the metal shield extends beyond the laminated portion and a second edge at which the insulating sheet extends beyond the laminated portion, the laminated composite being longitudinally folded about the cable core with the insulating material adjacent the core and forming a longitudinal seam in which the metallic shield extending at the first edge overlaps exteriorly the metal shield at the second edge and the insulating material sheet extending at the second edge overlaps interiorly the first edge.

2. The improvement according to claim 1 wherein the insulating material is poly(ethylene terephthalate).

3. The improvement according to claim 1 wherein the insulating material is polypropylene.

4. The improvement according to claim 1 wherein the insulating material is poly(4-methyl pentene).

5. The improvement according to claim 1 wherein the insulating material is acetylated paper.

6. The improvement according to claim 1 wherein the metallic shield is an aluminum shield.

7. An electrical cable comprising a core of at least one insulated metallic conductor, a thin film of polyethylene terephthalate surrounding the core, a continuous, annular aluminum shield longitudinally folded around and adhesively bonded to the film of polyethylene terephthalate, said film extending beyond one edge of the aluminum and the opposite edge of the aluminum extending beyond the edge of the film, and an outer polyethylene jacket surrounding the inner aluminum shield.

8. As a new article of manufacture for use in electric cables, a combined thermal barrier and metallic shield comprising a sheet of thermoplastic insulating material and a strip of metallic shielding material overlapped and bonded together at a common surface to form a laminated composite having a first edge at which the strip of metallic shielding material extends beyond the laminated portion and an opposite second edge at which the sheet of thermal insulating material extends beyond the laminated portion.

9. The article according to claim 8 wherein the metallic shield is bonded to the thermoplastic insulating material by means of an adhesive interlayer.

10. The article according to claim 8 wherein the metallic shield is coated with an adhesive material on at least the side adjacent the thermoplastic insulating material.

11. The article according to claim 8 wherein the metallic shield is coated on both sides with a layer of an adhesive material.

12. The article according to claim 8 wherein the metallic shield is aluminum and the insulating material is poly(ethylene terephthalate).

References Cited

UNITED STATES PATENTS

| | | | |
|---|---|---|---|
| 2,847,948 | 8/1958 | Truitt | 161—145 |
| 3,048,750 | 8/1962 | Netherwood et al. | 317—260 X |
| 3,049,651 | 8/1962 | Adelson et al. | 317—260 X |
| 3,206,541 | 9/1965 | Jachimowicz | 174—107 X |
| 3,233,036 | 2/1966 | Jachimowicz | 174—36 X |

LEWIS H. MYERS, *Primary Examiner.*

H. HUBERFELD, *Assistant Examiner.*